US012148283B2

(12) United States Patent
West et al.

(10) Patent No.: US 12,148,283 B2
(45) Date of Patent: Nov. 19, 2024

(54) INDICATOR DEVICE

(71) Applicant: CHECKPOINT SYSTEMS, INC., Thorofare, NJ (US)

(72) Inventors: Robert West, Bradenton, FL (US); Craig Bennett, Bradenton, FL (US)

(73) Assignee: CHECKPOINT SYSTEMS, INC., Thorofare, NJ (US)

( * ) Notice: Subject to any disclaimer, the term of this patent is extended or adjusted under 35 U.S.C. 154(b) by 0 days.

(21) Appl. No.: 18/015,191

(22) PCT Filed: Jul. 9, 2021

(86) PCT No.: PCT/US2021/041068
§ 371 (c)(1),
(2) Date: Jan. 9, 2023

(87) PCT Pub. No.: WO2022/011248
PCT Pub. Date: Jan. 13, 2022

(65) Prior Publication Data

US 2023/0260385 A1 Aug. 17, 2023

Related U.S. Application Data

(60) Provisional application No. 63/050,268, filed on Jul. 10, 2020.

(51) Int. Cl.
*G08B 21/22* (2006.01)
*G08B 21/18* (2006.01)

(52) U.S. Cl.
CPC .......... *G08B 21/182* (2013.01); *G08B 21/22* (2013.01)

(58) Field of Classification Search
USPC ........ 340/573.1, 426.19, 426.2, 426.21, 467, 340/539.13, 539.23, 539.21, 539.22,
(Continued)

(56) References Cited

U.S. PATENT DOCUMENTS 8,525,666 B2 * 9/2013 Melker .................. G16H 40/20 340/573.6
2008/0088438 A1 * 4/2008 Aninye .............. G08B 21/0286 340/539.13
(Continued)

OTHER PUBLICATIONS

Patent Cooperation Treaty (PCT), International Search Report and Written Opinion for Application PCT/US2021/041068 filed Jul. 9, 2021 mailed Oct. 19, 2021, International Searching Authority, US.

*Primary Examiner* — Daniel Previl
(74) *Attorney, Agent, or Firm* — McDonald Hopkins LLC

(57) ABSTRACT

An indicator device for detecting the presence of another device and alerting a user of the indicator device may comprise a housing, an electrical power source, a proximity sensor configured to detect the presence of the other device, and one or more indicator elements operable to alert the user of the indicator device where the proximity sensor is configured to operate the indicator element if the distance between the indicator device and the other device is below a predetermined value. The proximity sensor may be configured to operate the indicator element if the distance between the indicator device and the other device is within a predetermined distance.

38 Claims, 9 Drawing Sheets

(58) Field of Classification Search
USPC ................................ 340/539.12, 566, 572.1
See application file for complete search history.

(56) References Cited

U.S. PATENT DOCUMENTS

| | | | | |
|---|---|---|---|---|
| 2008/0313486 | A1* | 12/2008 | Parfitt .................. | G05B 19/054<br>713/600 |
| 2009/0079612 | A1* | 3/2009 | Parfitt .................. | G05B 19/054<br>341/157 |
| 2009/0082882 | A1* | 3/2009 | Parfitt .................. | G05B 19/054<br>700/14 |
| 2014/0197968 | A1 | 7/2014 | Mantie | |
| 2016/0073949 | A1* | 3/2016 | Grant ..................... | A61B 5/742<br>600/407 |
| 2016/0140831 | A1* | 5/2016 | Hermann ............... | G08B 21/24<br>340/573.1 |
| 2016/0202114 | A1 | 7/2016 | Alameh et al. | |
| 2017/0178512 | A1* | 6/2017 | Kannon ................. | B60Q 9/005 |

* cited by examiner

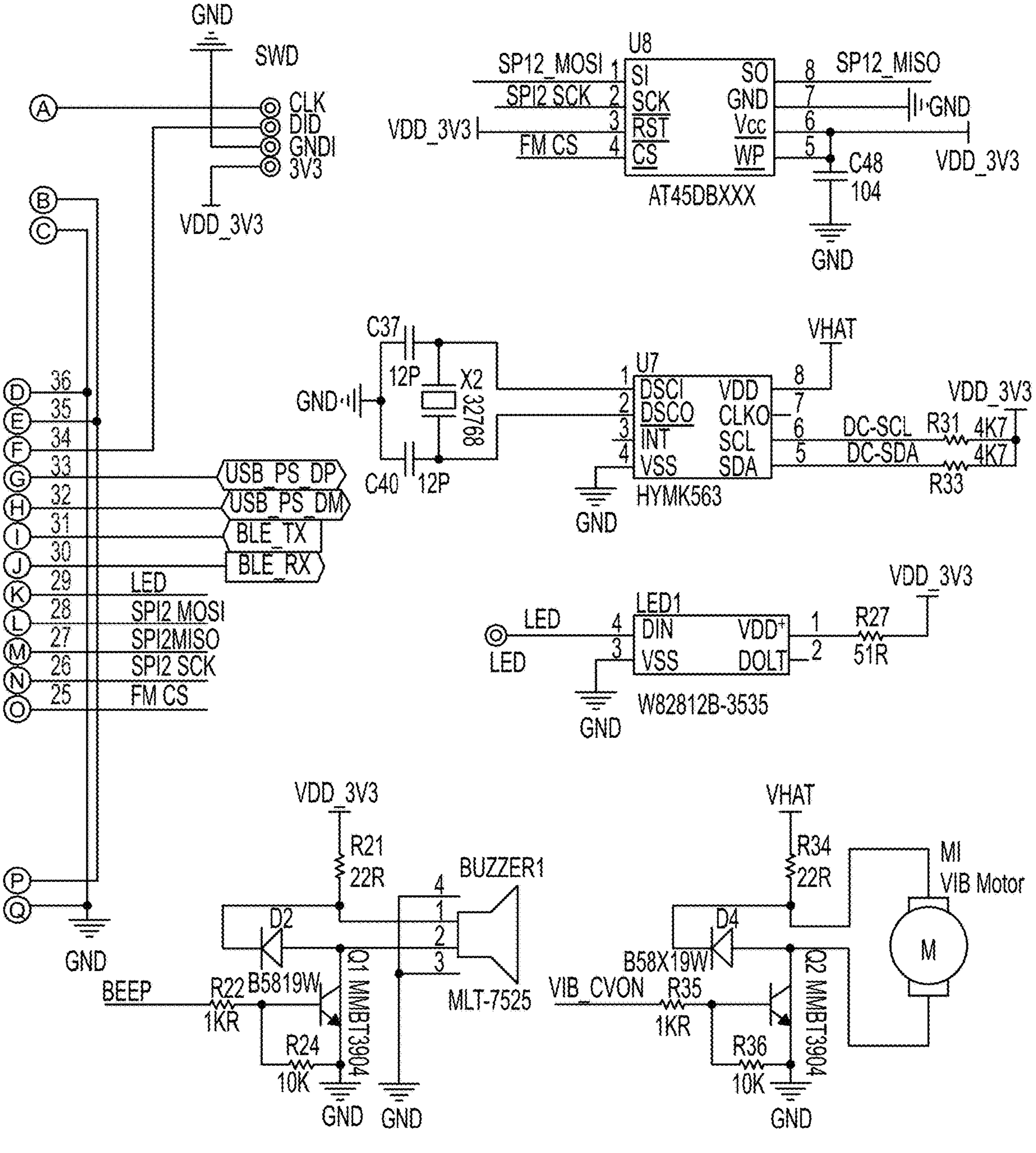
FIG. 8 (Cont..)

INDICATOR DEVICE

CROSS-REFERENCE TO RELATED APPLICATION

This application is a 35 U.S.C. 371 national stage filing of PCT Application No. PCT/US2021/041068, entitled "Indicator Device" filed on Jul. 9, 2021, which claims priority to U.S. Provisional Patent Application No. 63/050,268 entitled "Indicator Device" filed on Jul. 10, 2020, the entireties of which are hereby incorporated by reference.

FIELD OF THE INVENTION

The present invention relates to an indicator device for detecting the presence of another device and alerting a user of the indicator device when the devices are within a predetermined distance of one another. The present invention also relates to a system comprising two or more indicator devices, and a method of use thereof.

BACKGROUND TO THE INVENTION

In certain environments it may be desired to maintain a minimum, maximum, or predetermined range of separation distance between one person and another person or place. For example, during an epidemic or pandemic, governments or local authorities may mandate that a minimum separation distance should be maintained between persons, sometimes termed "social distancing." Additionally, in certain working environments, such as hazardous working environments, it may be desired for workers to maintain a minimum separation distance from each other to mitigate the risk of injury. In other applications, it may be desired to track worker positions as it pertains to other workers, to particular machinery or zone, or as within a shop floor, working site, manufacturing facility, or the like.

Known devices, such as mobile or cellular phones, which may be used for tracking location of a person, have a number of drawbacks. For example, mobile phone users may be reluctant to display the phone in a manner that allows others to observe it. For example, if a wearer of the mobile phone receives an alert, such as a personal text message or push notification, this would then be visible to those in close proximity. Likewise, if a phone call was received and answered, it may then be impractical for the mobile phone to be used as an indicator device to alert other users that an exclusion zone has been breached or that predetermined distance has been exceeded. Furthermore, in order to a mobile phone typically requires third party application software to be installed on the device to be able to fulfil the function above, and the received data is then accessible by the application software provider, which may compromise the privacy of the user.

It would be desirable to provide a device for tracking positioning of a person, for determining and indicating when a predetermined distance has been breached or exceeded between two or more people or between a person and one or more places, and, in particular, for indicating that the minimum separation distance between one user and another has been, or is at risk of being breached, that can operate and be displayed continuously, and that is straightforward to use without having to rely predominately on third party devices.

The present inventor has appreciated the shortcomings in known devices for detecting the presence of another user.

STATEMENTS OF INVENTION

According to a first aspect of the present invention there is provided an indicator device for detecting the presence of another device and alerting a user of the indicator device, the indicator device comprising:

- a housing;
- an electrical power source;
- a proximity sensor configured to detect the presence of the other device; and
- one or more indicator elements operable to alert the user of the indicator device;
- wherein the proximity sensor is configured to operate the, or each, indicator element if the distance between the indicator device and the other device is below a predetermined value.

The proximity sensor may be configured to operate the, or each, indicator element if the distance between the indicator device and the other device is within a predetermined value, a predetermined amount, or a predetermined length. The proximity sensor may be configured to operate the, or each, indicator element if the distance between the indicator device and the other device is within a predetermined distance.

The other device may be an indicator device. The other device may be an indicator device for detecting the presence of the indicator device of the first aspect of the invention and alerting a user of the other indicator device.

The other device may be an indicator device for detecting the presence of the indicator device of the first aspect of the invention, or another device, and alerting a user of the other indicator device, the other indicator device comprising:

- a housing;
- an electrical power source;
- a proximity sensor configured to detect the presence of the indicator device, or another device; and
- one or more indicator elements operable to alert a user of the other indicator device;
- wherein the proximity sensor is configured to operate the, or each, indicator element if the distance between the indicator device and the other device is below a predetermined value.

The, or each, indicator element may be operable to alert the user of the other device that the other device and the indicator device are within the predetermined distance. The other device may be configured to alert the user of the indicator device that the other device and the indicator device are within the predetermined distance. The, or each, indicator element of the other device may be operable to alert the user of the indicator device that the other device and the indicator device are within the predetermined distance.

The predetermined distance between the indicator device and the other device may define an exclusion zone, or safe working distance, from the user of the indicator device. The exclusion zone may be a social distancing zone. The exclusion zone may be a keep-out zone.

The proximity sensor may be configured to deactivate the, or each, indicator element if the other device is moved beyond the predetermined distance from the indicator device (outside of the exclusion zone). The indicator device may be configured to trigger and deactivate the indicator element(s) in response to the other device entering and leaving the exclusion zone. This may be done repeatedly. The proximity sensor may be operable to detect the other device within a predetermined range of the device. The range may be determined by a sphere having the predetermined distance as its radius. The exclusion zone may be substantially spherical.

The proximity sensor may be configured to trigger the indicator element(s) substantially instantaneously in response to the other device entering the exclusion zone. The proximity sensor may be configured to deactivate the indicator element(s) substantially instantaneously in response to the other device leaving the exclusion zone. The proximity sensor of the indicator device may be configured to operate the indicator element(s) substantially instantaneously in response to the indicator device and the other device being brought within the predetermined distance of each other, and/or the proximity sensor may be configured to deactivate the indicator element(s) substantially instantaneously in response to the indicator device and the other device no longer being within the predetermined distance of each other.

The indicator elements may be alarm elements operable to signal an alarm to a user of the indicator device that a user of the other device is at or within the predetermined distance between the indicator device and the other device. The indicator device may be a hazard warning device.

The indicator device may be operable to detect the presence of a plurality of other devices. The indicator device may be operable to detect the presence of a plurality of other devices within the exclusion zone. The indicator device may be configured to trigger the, or each, indicator element when at least one of the plurality of other devices is within the exclusion zone. The plurality of other devices may be substantially identical devices.

The proximity sensor of the indicator device may be configured to communicate with the proximity sensor of the other device. The proximity sensor of the indicator device may be configured to communicate only with the proximity sensor, or proximity sensors, of the other device, or the other devices.

The proximity sensor of the indicator device may be operable to pair with the proximity sensor of the other device. The proximity sensor of the indicator device may be operable to automatically pair with the proximity sensor of the other device. The indicator device may be configured to trigger the, or each, indicator element only when a substantially identical indicator device is detected within the exclusion zone. The proximity sensor may be configured to communicate only with identically programmed proximity sensors of the other device(s). The proximity sensor may be configured to detect the presence of identically programmed proximity sensors of the other devices and to discard or ignore the presence of other devices within the exclusion zone. The proximity sensor may be configured to operate the, or each, indicator element only when an identically programmed device is detected within the exclusion zone. That is, a device programmed to carry out the same functions as the indicator device.

The proximity sensor of the indicator device may be operable to detect the presence of the other device within the predetermined distanced without pairing with the proximity sensor of the other device.

The proximity sensor of the indicator device may be configured to detect the presence of identically configured proximity sensors of the other device(s). The proximity sensor of the indicator device may be configured to detect the presence of identically configured proximity sensors of the other devices and to discard or ignore the presence of other devices within the exclusion zone.

The proximity sensor may include a control module operable to send one or more signals to the, or each, indicator element in response to signals received from the other device. The control module may include an integrated circuit (IC). The control module may include a single IC.

The proximity sensor of the indicator device may include a pairing module operable to pair the proximity sensor of the indicator device with a proximity sensor of another device. The pairing module may be operable to automatically pair the indicator device with another device. The proximity sensor may be operable to detect that the indicator device and the other device are within the predetermined distance when the indicator device and the other device are paired.

The proximity sensor may be configured to be non-responsive to signals received from non-identical devices, or non-identically programmed devices. That is, devices that are not programmed to carry out the same functions as the indicator device.

The proximity sensor may be operable to maintain the indicator element(s) as inactive when non-identical devices are present within the exclusion zone, and when no identical other devices are within the exclusion zone. The proximity sensor may be configured to operate the indicator element(s) when an identical, other device, is within the exclusion zone and when a non-identical device is also within the exclusion zone.

The proximity sensor may include a device selection module operable to differentiate between other devices that should ignored and other devices whose presence should be detected. The proximity sensor may be operable to trigger the indicator element(s) by using the device selection module to identify only the other devices that should be responded to.

The proximity sensor may be configured to be non-responsive to signals received from a mobile, or cellular, phone. The proximity sensor may be operable to maintain the indicator element(s) as inactive when a mobile or cellular phone is within the exclusion zone and when no other devices are within the exclusion zone. The device selection module may be operable to filter out data received from mobile, or cellular, phones. The device selection module may be operable to exclude data received from a mobile, or cellular, phone.

The other device may comprise one or more of the corresponding features of the indicator device. The other device may comprise all of the corresponding features of the indicator device.

The indicator device may be a tag, a card, a security device, a security tag, badge, marker, identification device or identification card, identification tag, a status identification device, a wearable device such as a wristband, bracelet, necklace, headband, pin, mechanical or adhesive attachable device and/or other similar type device. The indicator device may further be integrated into a separate article that a user might wear such as a face mask, face shield, helmet, protective gear or other similar article. The indicator device may be configurable to include an authentication element, such that the indicator device can be used with an authentication element reader to regulate access to a secure or restricted area. The authentication element may be a barcode, a near field communication device, a photograph, indicia, a graphic, an image, text, a code, numbers, or any combination thereof, or the like.

The housing may be a tag, a card security device, security tag, badge, marker, identification device or identification card, identification tag, a status identification device, a wearable device such as a wristband, bracelet, necklace, pin, mechanical or adhesive attachable device and/or other similar type device. The housing may be configurable to include an authentication element, such that the indicator device can be used with an authentication element reader to regulate access to a secure or restricted area. The authentication element may be a barcode, a near field communication device, a photograph, indicia, a graphic, an image, text, a code, numbers, or any combination thereof, or the like.

The housing may be arranged to display the value of the predetermined distance of the exclusion zone. In this arrangement, the housing displays the value of the predetermined distance that will cause the proximity sensor to operate the indicator element(s). The housing may be arranged to continuously display the predetermined distance. The housing may include a label, graphic, image, text, numbers, or the like, for displaying the predetermined distance of the exclusion zone. The housing may be arranged such that the predetermined distance is always visible to the user of the other device when the other device is within the exclusion zone and when the indicator device is worn, carried, held, or otherwise placed in a visible location by the user of the indicator device.

The indicator device may be operable to receive data from another device as well as store all, some or none of the data from another device. The indicator device may be operable to discard at least some of the received data from the other device, or any other device. The indicator device may be configured to discard all data received from the other device, or any other device. The indicator device may be configured not to store any data received from the other device, or any other device. In this arrangement, no received data is stored by the indicator device.

The indicator device may be configured to discard all data associated with the use thereof (user data). The indicator device may be configured to not store any data obtained or inferred from the user of the indicator device, such as location data, or data concerning the activation and deactivation of the indicator device. In this arrangement, no user data is stored by the indicator device.

The indicator device may be configured to be unadaptable to store any data or information. The indicator device may be configured to be incapable of storing any data. The data or information may be regarding the historic location of the indicator device and/or the other device(s). The indicator device may be configured to be unable to store data or information relating to the activation or deactivation of the indicator device. The indicator device may be configured to be unable to store data or information relating to the operation of the indicator element(s).

The indicator device may lack a data storage device. The capacity of the indicator device to store user data may be 0 Bytes. The capacity of the indicator device to store received data may be 0 Bytes. That is, the indicator device may be devoid of a memory element for storing data received from another device, or data associated with the use of the indicator device.

The indicator device may be configured to contain a data storage device. The data storage device can be configured to store some or all of the data received from another device or data associated with the use of the device. The data storage device can be configured to transmit some or all of the data to a separate device that is configured to receive the data. The separate device that can be configured to receive the data can be, for example, a cell phone, computer, or other similar device.

The separate device can contain a program, such as an app, that can manipulate the data to create a desired output.

The indicator device may be configured such that a separate data storage device can be communicatively connected to the indicator device such that the received or user data can be transmitted and stored on the separate storage device.

The indicator device may be configured such that a data storage device cannot be communicatively connected therewith. In this arrangement, a data storage device cannot be connected to the device, such that received data or user data cannot be stored.

The indicator device may lack a data storage device, such as a memory element, and the indicator device may be configured such that a data storage device cannot be communicatively connected therewith.

The indicator device may be operable to automatically detect the presence of the other device, and to automatically trigger the, or each, indicator element. In this arrangement, the indicator device is a hands-free device. That is, the indicator device is a hands-free device when switched on.

The indicator element, or elements, may include an audio, visual, haptic, and/or vibrotactile indicator element or combinations thereof. The audio indicator element(s) may include one or more speakers, and/or buzzers, or the like. The visual indicator element(s) may include one or more light emitting diode(s) (LED), or the like. The visual indicator element(s) may include a red LED. At least one indicator element may include a vibrotactile device, haptic device, and/or a vibrator device.

The visual indicator element(s) may include a label, text, graphic, photograph, numbers, or the like, for displaying the meaning of the visual indicator element(s) to the user of the other device.

The power supply may be located within the housing. The proximity sensor may be located within the housing. At least one of the indicator element(s) may be located at an outer surface of the housing. At least one of the visual indicator elements may be located within the housing and arranged to be visible through the housing.

An indicator element may be located within the housing. The audio indicator element(s) may be located within the housing. All of the components of the indicator device may be located within the housing thereof.

The predetermined distance may be substantially less than or equal to 10 meters, optionally substantially less than or equal to 8 meters, optionally substantially less than or equal to 6 meters, optionally substantially less than or equal to 4 meters, optionally substantially less than or equal to 3 meters, optionally substantially less than or equal to 2.5 meters, optionally substantially less than or equal to 2.2 meters, optionally approximately 2 meters, optionally substantially less than or equal to 2 meters, optionally substantially less than or equal to 1.6 meters, optionally substantially less than or equal to 1.5 meters, optionally substantially less than or equal to 1 meter.

The range may be determined by a sphere having the predetermined distance as its radius, and the radius may be substantially less than or equal to 10 meters, optionally substantially less than or equal to 8 meters, optionally substantially less than or equal to 6 meters, optionally substantially less than or equal to 4 meters, optionally substantially less than or equal to 3 meters, optionally substantially less than or equal to 2.5 meters, optionally substantially less than or equal to 2.2 meters, optionally approximately 2 meters, optionally substantially less than or equal to 2 meters, optionally substantially less than or equal to 1.6 meters, optionally substantially less than or equal to 1.5 meters, optionally substantially less than or equal to 1 meter.

The proximity sensor may be operable to transmit and/or receive one or more signals to, or from, the proximity sensor of the other device.

The proximity sensor of the indicator device may comprise a receiver element and/or a transmitter element. The receiver element may be an electromagnetic radiation receiver element. The transmitter element may be an electromagnetic radiation transmitter element.

The proximity sensor may include a transceiver element (i.e. a transmitter and a receiver element). The transceiver element may be an electromagnetic radiation transceiver element.

The proximity sensor may be operable to wirelessly detect the presence of the other device. The proximity sensor may be a radio-frequency (RF) sensor, including, without limitation, near field communication sensor. The proximity sensor may be operable to detect the presence of the other device using one or more wireless communication protocols. The wireless communication protocol may be Bluetooth. The wireless communication protocol may be Ultra Wideband (UWB). The wireless communication protocol may be Wi-Fi or Zigbee. The wireless communication protocol may be Bluetooth low energy (Bluetooth LE or BLE). The wireless communication protocol may be a combination of two or more of Bluetooth, UWB, Wi-Fi, Zigbee or BLE.

The proximity sensor of the indicator device may be configured to only be responsive to proximity sensors comprising the same type of transmitter and receiver elements, or transceiver element(s) as the proximity sensor of the indicator device. The proximity sensor of the indicator device may be configured to only be responsive to proximity sensors comprising identical transmitter and receiver elements, or transceiver element(s) as the proximity sensor of the indicator device. The proximity sensor of the indicator device may be configured to only be responsive to proximity sensors comprising corresponding transmitter and receiver elements, or transceiver element(s) as the proximity sensor of the indicator device. The proximity sensor of the indicator device may be configured to only be responsive to proximity sensors that use an identical wireless communication protocol to the proximity sensor of the indicator device.

The receiver element may include a Bluetooth receiver element. The transmitter element may include a Bluetooth transmitter element.

The transceiver element may include a Bluetooth transceiver element. The proximity sensor may include a single Bluetooth transceiver element. The proximity sensor may include a single Bluetooth receiver element and a single Bluetooth transmitter element.

The receiver element may include a UWB receiver element. The transmitter element may include a UWB transmitter element. The transceiver element may include a Bluetooth transceiver element. The proximity sensor may include a single Bluetooth transceiver element. The proximity sensor may include a single Bluetooth receiver element and a single Bluetooth transmitter element. The receiver element may include a UWB receiver element. The transmitter element may include a BLE or Wi-Fi transmitter element. The proximity sensor may include a single UWB receiver element and a single BLE or Wi-Fi transmitter element. The control module may be operable to receive data from the transceiver element and to provide signals to the indicator element(s). The proximity sensor may comprise a single transceiver element and a single control module. The indicator device may comprise a single proximity sensor.

The proximity sensor may be configured to operate within a frequency band, or frequency bands, of the RF spectrum. The proximity sensor may be configured to operate within a frequency band having a frequency range of between approximately 3.1 GHZ to 10.6 GHz. The proximity sensor may be configured to operate within a frequency band having a frequency range of between approximately 2.4 GHZ to 2.4835 GHz, optionally approximately 2.4 GHz. The frequency band or bands may be located at a different region of the RF spectrum to the mobile phone, or cellular phone, network bands.

The indicator device may be a lightweight device. The weight of the device may be substantially less than 100 grams, optionally less than 80 grams, optionally less than 60 grams, optionally approximately 50 grams.

The indicator device may be a substantially planar device. The indicator device may have a thickness of substantially less than 20 mm, optionally less than 10 mm, optionally approximately 7 mm. The indicator may have a length of between approximately 50 mm and approximately 125 mm, optionally between 75 mm and 95 mm, optionally between 80 mm and 90 mm, optionally approximately 85 mm. The indicator may have a width of between approximately 25 mm and approximately 125 mm, optionally between 35 mm and 95 mm, optionally between 45 mm and 65 mm, optionally approximately 55 mm.

The housing may comprise substantially planar surfaces. The housing may be a substantially planar member. The housing may be a substantially cuboidal member.

The housing may comprise one or more attachment member receiving portions configured to receive one or more attachment members. The one or more attachment member receiving portions may be configured to attach the housing to an object. The object may be a lanyard, a belt, a clip, a hook, a key ring, pin, mechanical or adhesive attachable device, webbing, string, rope, and/or a chain.

The housing may comprise one or more user attachment member receiving portions configured to receive one or more user attachment members. The user attachment member receiving portion(s) may be a hole, an aperture, a slot, an orifice, a tab, a protrusion, or the like. The user attachment member may be a lanyard, a belt, a clip, a hook, a key ring, webbing, pin, adhesive attachable device string, rope, and/or a chain, or the like.

The indicator device may be configured to be wearable. The indicator device may be configured to be a wearable device. The indicator device may be configured to be worn, in use, around a user's neck, wrist, ankle or other body part depending upon the circumstances. The indicator device may be configured, in use, to be positioned or arranged substantially around the chest area of a user.

The indicator device may be configured to be attachable to a user, or an object. The indicator device may be configured to be attachable to a garment. The indicator device may be configured to be attachable to a pocket, pouch, belt, waistband, sleeve, or the like, of a garment. The indicator may be configured to be mechanically or adhesively attached to a user, to an object or to a garment. The adhesive may be a removable adhesive. The adhesive may be a pressure sensitive adhesive (PSA). The adhesive may be a skin friendly adhesive. The adhesive may exhibit a combination of being removable, PSA and/or skin friendly. In one embodiment the indicator device may be attached to a safety device, such as a face mask or face shield, of the user by mechanical attachment such as a hook and loop fastening mechanism, snap-type fastener or by an adhesive element such as a tape. The tape can be a removeable and/or replaceable. The indicator device may further be directly integrated into a separate article that a user might wear such as a face mask, face shield, helmet, protective gear or other similar article.

The indicator element(s) may be arranged in and/or on the housing such that they are visible and/or audible by any user within the exclusion zone, or in proximity to the exclusion zone. The indicator element(s) may be arranged in and/or on the housing such that they are visible and/or audible by the user of the indicator device.

The indicator device may comprise one or more control elements operable to activate and deactivate the indicator device. The control element may be configured to deactivate the indicator device, or the indicator element(s) thereof. The control element may be configured to deactivate the indicator device, or the indicator element(s) thereof for a period of time, optionally for approximately 2 minutes, optionally for 2 minutes or less, optionally for approximately 1 minute, optionally for 1 minute or less, optionally for approximately 30 seconds, optionally for 30 seconds or less.

The control element may be a switch. The switch may be a push button, or the like. The indicator device may be deactivated by pressing the switch once. The control element may be an electronic switch. The control element may be an electro-mechanical switch. The control element may be operable to override the operation of the control module. That is, to prevent the control module from activating the indicator element(s).

The power supply may be a battery, optionally a rechargeable battery. The battery may be a thin film battery. The battery may be a coin cell battery. The indicator device may comprise a power supply status indicator element. The power supply status indicator element may include a LED, an amber, yellow, or orange LED, or the like. The power supply status indicator may have a different appearance to the visual indicator element(s).

The indicator device may be configured to have an operation time of at least 2 weeks. In this arrangement, the indicator device can be continuously used for 2 weeks or more without replacing or recharging the power supply.

The indicator device may include a recharging port for recharging the power supply. The recharging port may be a universal serial bus (USB) port, or the like. The recharging port may include a wireless charging element, such as a near field communication (NFC) charging element.

The housing may include one or more labels, indicia, signs, or the like. The housing may be compatible with one or more printing techniques. The printing technique may be inkjet printing, screen printing, or digital screen printing.

The housing may comprise one or more substantially planar surfaces. The, or each, substantially planar surface may be configured to be compatible with one or more printing techniques. The housing may comprise one or more major planar surfaces. The major surface, or surfaces, may have a larger surface area than the other surfaces of the housing. The, or each, major planar surface may be compatible with one or more printing techniques.

At least one of the indicator element(s) of the indicator device may be located on the same surface of the housing as at least one of the control elements. The visual indicator element(s) may be located on the same surface of the housing. All of the visual indicator elements of the indicator device may be located on the same surface of the housing. The visual indicator element(s) and the control element(s) may be located on the same surface of the housing.

The housing may include an antimicrobial agent located on at least a portion of one or more surfaces of the housing. The housing may comprise one or more antimicrobial surfaces, or layers.

The housing may be made from a plastics material. The housing may be made from acrylonitrile butadiene styrene, or polycarbonate. The housing may be manufactured using a moulding process. The moulding process may be injection moulding, or the like.

The power supply, the indicator element(s) and the proximity sensor may be located on one or more substrates. The power supply, the indicator element(s) and the proximity sensor may be located on a single substrate. The substrate may be a printed circuit board (PCB). All of the electronic components of the indicator device may be located on the one or more substrates, or on the single substrate.

The housing may be configured to accommodate the one or more substrates. The housing may be configured to accommodate the single substrate.

The housing may include a light transmissive element. The light transmissive element may be a substantially optically transparent member. The light transmissive element may be located on an outer surface of the housing. The light transmissive element may be located on a planar surface of the housing. The light transmissive element may be arranged to be backlit by the visual indicator element. The light transmissive element may be arranged to be coplanar with at least one surface of the housing. The light transmissive element may be an elongate member. The light transmissive element may be a substantially rectangular element. The light transmissive element may include one or more substantially rectangular elements, At least a portion of the light transmissive element may be located on a major surface of the housing. At least a portion of the light transmissive element may be located on an upper minor surface of the housing. In this arrangement, the wearer or user of the indicator device can observe at least one of the visual indicator element(s) by looking down onto the indicator device.

According to a second aspect of the invention there is provided a system comprising:

two or more indicator devices, wherein each indicator device is for detecting the presence of the other indicator device, or another device, and alerting a user of the indicator device, each indicator device comprising:

a housing;

an electrical power source;

a proximity sensor configured to detect the presence of the other indicator device, or another device; and one or more indicator elements operable to alert a user of the indicator device;

wherein the proximity sensor is configured to operate the, or each, indicator element if the distance between the indicator device and the other device is below a predetermined value.

Embodiments of the second aspect of the present invention may include one or more features of the first aspect of the present invention or its embodiments. Similarly, embodiments of the first aspect of the present invention may include one or more features of the second aspect of the present invention or its embodiments.

According to a third aspect of the invention there is provided a method of using an indicator device, comprising the steps of:

(i) providing: an indicator device for detecting the presence of another device and alerting a user of the indicator device, the indicator device comprising:
a housing;
an electrical power source;
a proximity sensor configured to detect the presence of the other device; and
one or more indicator elements operable to alert a user of the indicator device;
wherein the proximity sensor is configured to operate the, or each, indicator element if the distance between the indicator device and the other device is below a predetermined value;
(ii) activating the indicator device; and
(iii) using the indicator device to determine whether the indicator device and the other device are below the predetermined value.

The method may comprise the step of deactivating the device to allow the user of the indicator device to breach the predetermined distance between the indicator device and the other device. The method may comprise the step of reactivating the device. The step of reactivating the device may be carried out when the indicator device is located beyond the predetermined distance from the other device.

The method may comprise the step of attaching the indicator device to the wearer thereof. The method may comprise the step of arranging the indicator device such that is visible in use to the user of the other device, when the other device is within the predetermined distance to the indicator device.

Embodiments of the third aspect of the present invention may include one or more features of the first and/or second aspects of the present invention or their embodiments. Similarly, embodiments of the first and/or second aspects of the present invention may include one or more features of the third aspect of the present invention or its embodiments.

According to a fourth aspect of the invention, there is provided a method of using a system comprising the steps of:
(i) providing: two or more indicator devices,
wherein each indicator device is for detecting the presence of the other indicator device, or another device, and alerting a user of the indicator device, each indicator device comprising:
a housing;
an electrical power source;
a proximity sensor configured to detect the presence of the other indicator device, or another device; and
one or more indicator elements operable to alert a user of the indicator device;
wherein the proximity sensor is configured to operate the, or each, indicator element if the distance between the indicator device and the other device is below a predetermined value.
(ii) activating each indicator device; and
(iii) using each indicator device to determine whether the indicator device and the other indicator are below the predetermined value.

Embodiments of the fourth aspect of the present invention may include one or more features of the first, second and/or third aspects of the present invention or their embodiments. Similarly, embodiments of the first, second and/or third aspects of the present invention may include one or more features of the fourth aspect of the present invention or its embodiments.

According to a fifth aspect of the present invention there is provided an indicator device for detecting the presence of another device and initiating an alert, the indicator device comprising:
a housing;
an electrical power source;
a proximity sensor configured to detect the presence of the other device; and
one or more indicator elements operable to initiate an alert;
wherein the proximity sensor is configured to operate the, or each, indicator element if the distance between the indicator device and the other device is below a predetermined value.

Embodiments of the fifth aspect of the present invention may include one or more features of the first, second, third and/or fourth aspects of the present invention or their embodiments. Similarly, embodiments of the first, second, third and/or fourth aspects of the present invention may include one or more features of the fifth aspect of the present invention or its embodiments.

According to a sixth aspect of the invention, there is provided a method of using an indicator device, the method comprising the steps of:
(i) providing an indicator device for detecting the presence of another device and initiating an alert, the indicator device comprising:
a housing;
an electrical power source;
a proximity sensor configured to detect the presence of the other device; and
one or more indicator elements operable to initiate an alert;
wherein the proximity sensor is configured to operate the, or each, indicator element if the distance between the indicator device and the other device is below a predetermined value;
(ii) activating the indicator device; and
(iii) using the indicator device to determine whether the indicator device and the other device are below the predetermined value.

Embodiments of the sixth aspect of the present invention may include one or more features of the first, second, third, fourth and/or fifth aspects of the present invention or their embodiments. Similarly, embodiments of the first, second, third, fourth and/or fifth aspects of the present invention may include one or more features of the sixth aspect of the present invention or its embodiments.

BRIEF DESCRIPTION OF THE DRAWINGS

Embodiments of the invention will now be described, by way of example, with reference to the drawings, in which.

DESCRIPTION OF EMBODIMENTS

Figure 1:
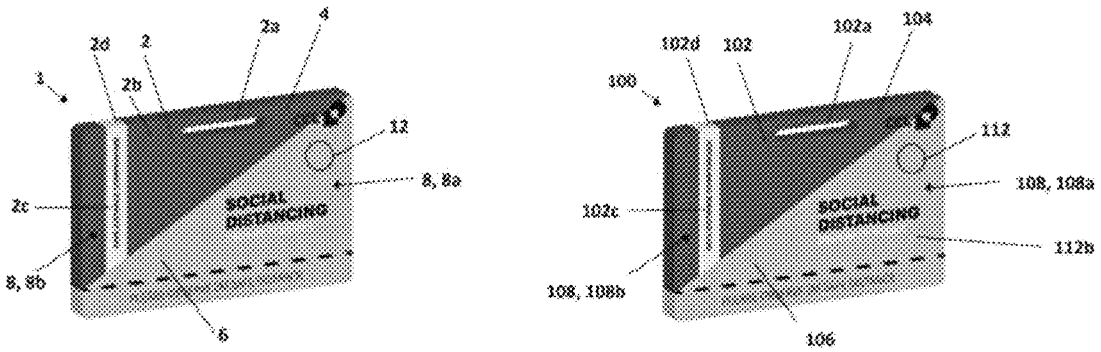
FIG. 1*a* shows an embodiment of a first indicator device and FIG. 1*b* shows an embodiment of another indicator device according to an aspect of the invention.

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings.

As used herein, the words “example” and “exemplary” mean an instance, or illustration. The words “example” or “exemplary” do not indicate a key or preferred aspect or embodiment. The word “or” is intended to be inclusive rather an exclusive, unless context suggests otherwise. As an example, the phrase “A employs B or C,” includes any inclusive permutation (e.g., A employs B; A employs C; or A employs both B and C). As another matter, the articles “a” and “an” are generally intended to mean “one or more” unless context suggest otherwise.

With reference to FIGS. 1 to 3*b*, shown is an indicator device 1 for detecting the presence of another indicator device 100 and alerting a user of the indicator device 1. The indicator device 1 illustrated and described herein is capable of being used as a social distancing device to enforce a recommended safe distance between the user of the indicator device 1 and the user of the other device 100. Likewise, the devices 1, 100, can be used to help enforce minimum safe working distances between two or more persons or to track one or more persons as it pertains to other persons, to particular machinery or zone, or as within a shop floor, working site, manufacturing facility, or the like.

The indicator device 1 may comprise a housing 2, an electrical power source 4 (located within the housing 2), a proximity sensor 6 configured to detect the presence of the other indicator device 100 or the presence of another proximity sensor, for example, 106, or another device (not shown), and one or more indicator elements 8 operable to alert the user of the indicator device 1 when certain data or criteria are met. In an embodiment, the proximity sensor 6 is configured to operate each indicator element 8 if the distance between the indicator device 1 and the other device 100 (or sensor) is below a predetermined value or within a predetermined range.

Whilst in the embodiments illustrated and described herein, the other device 100 is an indicator device for detecting the presence of the indicator device 1, and alerting a user of the other indicator device 100, it will be appreciated that in other embodiments the other device 100 could be a different type of device. For example, the indicator device 1 may alert to or associate with a GPS system, cellular phone, proximity sensor or other sensor that is attached to machinery, that establishes certain zones within a location, or the like.

In some embodiments, the indicator device 1 and the other device 100 may be identical devices, also referred to as the second indicator device 100. However, it will be appreciated that, in other embodiments, the devices 1, 100, may not be identical. In an embodiment, the other device 100, similar or identical to the first indicator device 1 may comprise a housing 102, an electrical power source 104 (located within the housing 102), a proximity sensor 106 configured to detect the presence of the indicator device 1 or the presence of another proximity sensor, for example, 6, or another device (not shown), and one or more indicator elements 108 operable to alert a user of the other indicator device 100 when certain data or criteria are met. In an embodiment, the proximity sensor 106 is configured to operate each indicator element 108 if the distance between the indicator device 1 and the other device 100 (or sensor) is within the predetermined distance or within a predetermined range.

In an embodiment, the other device 100 comprises all of the corresponding features of the indicator device 1. The devices 1, 100 may include a non-transitory computer readable medium having stored thereon software instructions that, when executed by a processor, cause the processor to generate the applicable signal to operate the indicator element 8, 108 if the distance between the device 1 and other device 100 is within the predetermined distance.

Figure 2:
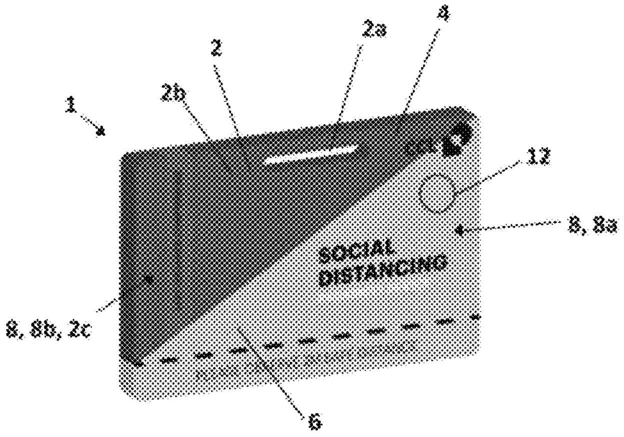
FIG. 2 shows the indicator device of FIG. 1*a*, when the device detects another device is within or outside of the predetermined distance.

In an embodiment, and as best shown in FIG. 2, each indicator element 8 of the indicator device 1 is operable to alert the user of the other device 100 that the other device 100 and the indicator device 1 are within the predetermined distance. Likewise, each indicator element 108 of the other device 100 is operable to alert the user of the indicator device 1 that the other device 100 and the indicator device 1 are within the predetermined distance. Thus, in this embodiment, the indicator device 1 and the other device 100 each signal an alert to both users thereof. In an embodiment, both indicator elements 8, 108 of each the first and second indicator devices 1, 100 may alert the corresponding user simultaneously or at substantially the same time.

The predetermined distance between the indicator device 1 and the other device 100 may define an exclusion zone, or safe working distance, from the user of the indicator device 1. In this embodiment, the exclusion zone is determined by a sphere having the predetermined distance as its radius.

When the indicator elements 8, 108, are active, the proximity sensor 8, 108, of the indicator device 1 and the other device 100 may be operable to deactivate each indicator element 8, 108 of the opposite device 100, 1 if the devices 1, 100 are moved beyond the predetermined distance (outside of the exclusion zone). This can be done repeatedly and continually, such that the devices 1, 100, can continuously activate and deactivate the indicator elements 8, 108, of the opposite device 100, 1 and the distance between the two devices 1, 100, can be continuously monitored and alerted when the certain criteria or distances are met.

In an embodiment, the proximity sensor 8, 108, of the indicator device 1 and the other device 100 are configured to trigger or activate the indicator element(s) 8, 108, substantially instantaneously in response to the opposite device 2, 100 entering the exclusion zone (or when the predetermined criteria, such as less than the minimum distance, is reached) and to deactivate the indicator element(s) 8, 108, substantially instantaneously in response to the opposite device 1, 100 leaving the exclusion zone (or when the predetermined criteria, such as more than the minimum distance, is reached). In other embodiments, there may be a delay between the devices 1, 100 being within, or outside of, the exclusion zone (i.e., within, or outside of, the predetermined distance) and the subsequent triggering or deactivation of the indicator elements 8, 108. For example, the devices The indicator device 1 may also be operable to detect the presence of a plurality of other devices (not shown) within the exclusion zone or when a certain predetermined criteria is met, such as minimum or maximum distance, and the indicator device 1 may be configured to trigger each indicator element 8 when at least one of the plurality of other devices is within the exclusion zone or when a certain predetermined criteria is met, such as minimum or maximum distance. The plurality of other devices could be substantially identical devices to the indicator device 1.

The proximity sensor 6 of the indicator device 1 may be configured to communicate only with the proximity sensor 106 of the other device 100, or the other devices (not shown).

In an embodiment, the indicator device 1 is configured to trigger the (or each) indicator element 8 only when a substantially identical indicator device is detected within the exclusion zone and to discard or ignore the presence of any other devices that may be within the exclusion zone. The proximity sensor 6 is configured to operate each indicator element 8 only when an identically programmed device is detected within the exclusion zone. That is, a device programmed to carry out the same functions as the indicator device 1.

In an embodiment, the proximity sensor 6 of the indicator device 1 includes a control module 6*a* operable to send one or more signals to each indicator element 8 of in the indicator device 1 in response to signals received from the other device 100, which, in turn, also includes a control module 106*a* operable to send one or more signals to its indicator elements 108 in response to signals received from the indicator device 1.

Figure 3A:
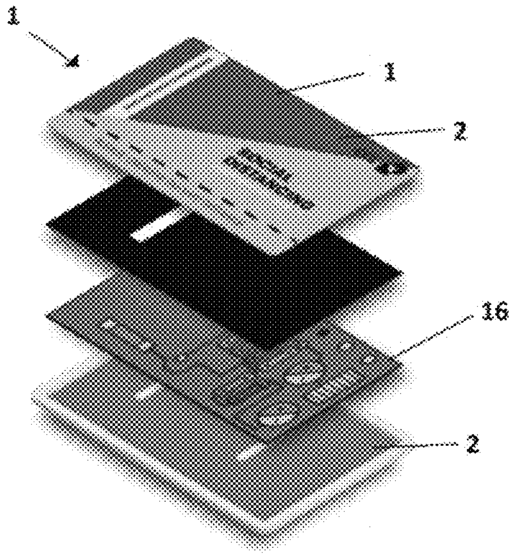
FIGS. 3*a* and 3*b* shows an exploded view of the indicator device of FIG. 1*a*, and a detailed view of the printed circuit board of the indicator device.
Figure 3B:
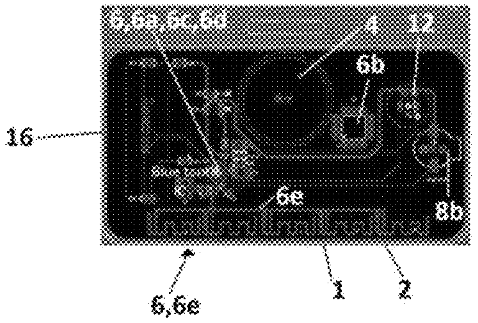

As shown in FIG. 3*b*, the control module 6*a* may include a single integrated circuit (IC) 6*b*.

In an embodiment, the proximity sensor 6 of the indicator device 1 could include a pairing module 6*c* operable to pair the proximity sensor 6 of the indicator device 1 with a proximity sensor 106 of the other device 100. The pairing module 6*c* may be operable to automatically pair the indicator device 1 with another device 100. In this embodiment, the proximity sensor 6 is operable to detect that the indicator device 1 and the other device 100 are within the predetermined distance without requiring that the indicator device 1 and the other device 100 are paired.

In an embodiment, the proximity sensor 6 is configured to be non-responsive to signals received from non-identical devices, or non-identically programmed devices. That is, devices that are not programmed to carry out the same functions as the indicator device 1. The proximity sensor 6 is operable to maintain the indicator elements 8 as inactive when substantially non-identical devices are present within the exclusion zone, and when no identical other devices 100 are within the exclusion zone. The proximity sensor is configured to operate the indicator elements 8 when an identical, other device 100, is within the exclusion zone regardless of when or if a non-identical device is also within the exclusion zone. It is also noted, however, that the proximity sensor may be configured to operate the indicator elements 8 when a non-identical device is within the exclusion zone regardless of whether or not an identical, other device 100, is within the exclusion zone.

The proximity sensor 6 includes a device selection module 6*d* operable to differentiate between other devices that should ignored or be unnoticed and other devices 100 whose presence should be detected, and the proximity sensor 6 is operable to trigger the indicator elements 8 by using the device selection module 6*d* to identify only the other devices 100 that should be responded to or that should prompt an alert notice to the user.

The proximity sensor 6 is configured to be non-responsive to signals received from a mobile or cellular phone, or the like, and to maintain the indicator elements 8 as inactive when a mobile or cellular phone, or the like, is within the exclusion zone (or within a predetermined distance) and when no other devices for alerting are within the exclusion zone (or within a predetermined distance). The device selection module 6*d* is operable to filter out and exclude data received from mobile or cellular phones, and other similar devices like radios, intercoms, pagers, and the like.

In the embodiment illustrated and described here, the indicator device 1, specifically the housing 2 thereof, is a tag. However, it should be appreciated that the indicator device 1 and optionally the housing 2 thereof could be a card security device, security tag, badge, marker, identification device or identification card, identification tag, a status identification device, a wearable device (either a disposable or non-disposable) such as a wristband, bracelet, necklace, pin, mechanical or adhesive attachable device and/or other similar type device. Furthermore, in some embodiments, the indicator device 1 could be configurable to include an authentication element, such that the indicator device can be used with an authentication element reader to regulate access to a secure or restricted area. The authentication element may be a barcode, a near field communication device, a photograph, indicia, a graphic, an image, text, a code, numbers, or any combination thereof, or the like.

As shown in FIG. 1, the housing 2 may be arranged to display the value of the predetermined distance of the exclusion zone (e.g., the value of the predetermined distance that will cause the proximity sensor 6 to operate the indicator elements 8). As the value may be displayed using text, the housing 2 may continuously display the predetermined distance (e.g. 2 meters or 6 feet). It will be appreciated that the housing 2 could include a label, graphic, image, text, numbers, or the like, for displaying the predetermined distance of the exclusion zone. Therefore, in this embodiment, the housing 2 is arranged such that the predetermined distance is always visible to or readable by another person, for example, the user of the other device 100, when the other person or the user of the other device 100 is within the exclusion zone and when the indicator device 1 is worn, carried, held, or otherwise placed in a visible location by the user of the indicator device 1. For example, certain text on the indicator device 1, such as the predetermined distance 2 meters or 6 feet, when worn by the user may be visible or readable to other persons only when those other persons are within the predetermined distance, such as 2 meters or 6 feet, thus indicating to the other persons that the minimum distance has not been maintained and that further distance is needed.

The indicator device 1 may be operable to receive data from the other device 100, or any other device, and to discard all of the received data from the other device 100, or any other device (i.e. no received data is stored). In an embodiment, the indicator device 1 is configured to discard all data associated with the use thereof (user data). That is, the indicator device 1 is configured to not store any data obtained or inferred from the user of the indicator device 1, such as location data, or data concerning the activation and deactivation of the indicator device 1. In this arrangement, no user data is stored by the indicator device 1. Therefore, the present invention is thought to be advantageous over other devices, as no user data or received data is stored by the indicator device 1, and thus the privacy of the user thereof is maintained.

The indicator device 1 can also be configured to be adaptable to store any data or information, and can be capable of storing any data (e.g. regarding the historic location of the indicator device and/or the other device(s), or relating to the activation or deactivation of the indicator device 1).

In one embodiment the indicator device 1 lacks a data storage device or component, or ability (e.g. cloud connections). The capacity of the indicator device 1 to store user data and received data is 0 Bytes. That is, the indicator device 1 is devoid of a memory element for storing data received from another device 100, or data associated with the use of the indicator device. Furthermore, the indicator device 1 is configured such that a data storage device cannot be communicatively or physically connected therewith (i.e., a data storage device cannot be connected to the device, such that received data or user data cannot be stored).

In one embodiment the indicator device 1 contains a storage device. The storage device can be a memory chip or similar device, or it may include the ability to transmit data to a server or cloud storage. The storage device can be configured to store some or all of the received data or user data. The storage device can be configured to permanently store received data or user data. The storage device can be configured to temporarily store received data or user data, i.e., 24 hours, 7 days, 30 days, 60 days, 90 days, etc. The data can be accessed and analysed to determine if the user violated the applicable exclusion zone during any predetermined time. This information can be used to determine compliance with any requirements or regulations to maintain an appropriate distance from others. This information may also be used for other purposes, including tracking a worker's working hours and position, HR complaints, worker's compensation claims, other liability, etc.

It is thought to be advantageous that the indicator device 1 of the present invention may be operable to automatically detect the presence of the other device 100, and to automatically trigger each indicator element 8. In this arrangement, the indicator device 1 is a hands-free device. That is, the indicator device is a hands-free device when switched on. The indicator device may include a clip or lanyard to facilitate wearing or the device on a body of a user, or the indicator device may be sized and shaped to as to fit in a user's pocket, uniform, or working attire. In an embodiment, the indicator device may be sized and shaped as a card, such as a badge, identification card, or the like. For example, the indicator device may have the approximate length and width of a card, and may have a depth or thickness that is sized to fit the components therein. In an embodiment, badge or identification information may also be integrated onto the indicator device so that the indicator device may also serve as a badge or identification card and vice versa.

In an embodiment, the indicator elements 8 include an audio indicator element 8*a* (a buzzer or beeping system, as examples of an audible device) and a visual indicator element 8*b* (such as a red LED). The visual indicator element 8*b* may include a label or text for displaying the meaning of the visual indicator element 8*b* to the user of the other device 100. It is noted that the indicator device may include one or more auditory indicators, one or more visual indicators, and/or one or more tactile or haptic indicators. For example, the indicator may include only a single auditory indicator, such as a buzzer or beeping system. The indicator device may include a progressive or gradual auditory indicator or system, such as softer and slower beeps for when a user or other device is near breaching an exclusion zone or entering a predetermined distance, louder and faster beeps for when a user or other device has just breached or is at the approximate "edge" of an exclusion zone or predetermined distance, and very loud and non-stop beeping for when a user or other device has fully breached an exclusion zone or entered a predetermined distance. The gradual auditory indicator or alerting system may be based on different thresholds of distance and/or based on how much time a user has been within a certain predetermined distance or zone. It is also noted that instead of the auditory indicator, the indictor may include a visual indicator or system such as a series of more than one light, different color lights, different brightness of the lights, etc., to signify different alerts to the user. Similarly, the indicator may include a tactile indicator or system, such as a vibration, that has a different vibration pattern or intensity of vibration to signify different alerts to the user.

In an embodiment, all of the components of the indicator device 1 are located within the housing 2.

In the embodiment illustrated and described here, the predetermined distance is approximately 2 meters. It will be appreciated that the indicator device 1 could be designed to work with another predetermined distance (such as one meter).

The range of the indicator device may be determined by a sphere having the predetermined distance as its radius, and the radius approximately 2 meters. However, the proximity sensor 6 of the indicator device 1 could be arranged or configured to have a different type of range (e.g. aspherical). The range of the indicator may also be determined as a dome having the predetermined distance as its radius (i.e. no downward measurement). The range of the indicator may also be determined horizontally from the user (i.e. no vertical measurement), and the like.

The proximity sensor 6 may include a transceiver element 6*e* (i.e. a transmitter and a receiver element), operable to wirelessly detect the presence of the other device 100 using Bluetooth (an example of a wireless communication protocol). It will be appreciated that other wireless communication protocols could be used, such as cellular, Bluetooth LE, UWB, Wi-Fi, Zigbee or a combination thereof. One embodiment includes a UWB component to position, detect, measure, and collect signals from other indicator devices and may also be used to store data generated from these signals in a storage device contained within the indicator device. A BLE or Wi-Fi component may send the data to a separate device such as a cell phone, computer or other similar device where the data is processed into a user defined output or may send the data to a cloud server or other storage device. The device may include a non-transitory computer readable medium having stored thereon software instructions that, when executed by a processor, cause the processor to generate the applicable data.

In one embodiment, the proximity sensor utilizes UWB in combination with an antenna system to increase the UWB's range and reception reliability. The antenna system can be a ceramic antenna system. The UWB proximity sensor positions, detects, measures, and collects data from other indicator devices. The UWB, in operation, sends signals from approximately every 2 nano-seconds (ns) up to hundredths of milli-seconds (ms) to achieve real time accuracy. In one embodiment, the UWB sends a signal to search for other devices approximately every 150 ms. In one embodiment, the UWB can use Time of Flight (ToF) to measure the distance between a UWB proximity sensor in one device and a UWB proximity sensor in another device. In one embodiment, the data collected is transmitted to a separate receiving device such as a cell phone, computer or other device that is capable of receiving such data, or is sent to a cloud server or other storage device. The data can be communicated to the separate receiving device by BLE, Wi-Fi or Bluetooth. The data may be communicated directly to the separate receiving device with or without storage on the indicator device.

The proximity sensor 6 of the indicator device 1 may be configured to only be responsive to proximity sensors 106 comprising the same type of transceiver element 6*e* and wireless communication protocol (i.e. Bluetooth or UWB) as the proximity sensor 6 of the indicator device 1.

The control module 6*a* may be operable to receive data from the transceiver element 6*e* and to provide signals to the indicator elements 8. In an embodiment, the proximity sensor 6 comprises a single transceiver element 6*e* and a single control module 6*a*. The present invention therefore may include significantly fewer components or electronic circuitry than more complex devices, such as mobile phones.

The proximity sensor 6 may be configured to operate within a frequency band, or frequency bands, of the RF spectrum. In an embodiment, the proximity sensor is configured to operate within a frequency band having a frequency range of between approximately 2.4 GHZ to 2.4835 GHz. The frequency band or bands may be located at a different region of the RF spectrum to the mobile phone, or cellular phone, network bands. In one embodiment the proximity sensor may be configured to operate within a frequency band having a frequency range of between approximately 3.1 GHZ to 10.6 GHz.

In an embodiment, the indicator device 1 is a lightweight device and weighs approximately 50 grams.

The indicator device 1 may be a substantially planar device, and has a thickness of approximately 7 mm, a length of approximately 85 mm, and a width of between approximately 55 mm. As described here, the indicator device may generally be sized and shaped as a card, badge, or identification card.

In an embodiment, the cuboidal housing 2 comprises substantially planar surfaces and is a substantially planar member.

The housing 2 may comprise a hole/aperture 2*a* (an example of an attachment member receiving portion), configured to receive one or more user attachment members configured to attach the housing 2 to an object. The user attachment members or object could be a lanyard, a belt, a clip, a hook, a key ring, webbing, string, rope, and/or a chain.

In an embodiment, the indicator device 1 is configured to be wearable, and can be worn, in use, around a user's neck with, for example, a lanyard, such that the indicator device 1 is arranged substantially around the chest area of the user. The indicator device 1 may also be attached to a user's shirt, by for example, a clip, a user's belt, a user's keychain, and the like.

In an embodiment, the indicator elements 8 are arranged in and/or on the housing 2 such that they are visible and/or audible by any user within the exclusion zone, or in proximity to the exclusion zone and by the user of the indicator device 1.

The indicator device 1 may comprise a switch 12 (an example control element) operable to activate and deactivate the indicator device 1 (i.e. to turn it on and off). In an embodiment, the switch is configured to deactivate the indicator elements 8 temporarily or for a set period of time, for example approximately 1 minute, 5 minutes, 10 minutes, etc. In this arrangement, the indicator device 1 can be deactivated to allow the user to approach a user of the other device 100 and then will reactivate automatically after the set amount of time and alert the user if the user is still in the exclusion zone of another device 100. For example, it may be advantageous to allow two workers or users minimal time within the same zone or near one another. Additionally, the switch may instead be used to deactivate the device for a longer period of time, for example, 1, 2, 3, 4, 8 hours or until the switch is activated again. For example, members of the same household may not be required to comply with social distancing, and therefore it may be advantageous to allow for the indicator device 1 to be deactivated if for example, both members of the same household are outside of the home and wish to exchange an object. It will be understood that in this scenario, when in the home, the indicator device 1 would not be used and would thus be deactivated, until the user ventured outside again.

In an embodiment, the switch 12 is a push button, and the indicator device 1 is deactivated by pressing the switch once. It will be appreciated that other types of control element could be used, such as another type of switch, including a push switch, a turn knob, or the like.

In an embodiment, the power supply 4 is a coin cell battery, including an amber LED (an example power supply status indicator element, not shown). In an embodiment, the power supply 4 may be a rechargeable battery.

The indicator device 1 may be configured to have an operation time of at least 2 weeks. In this arrangement, the indicator device 1 can be continuously used for 2 weeks or more without replacing or recharging the power supply, which is thought to be advantageous over devices that must be recharged more frequently, particularly as it may be essential during a pandemic or epidemic, or in a hazardous work environment, that a safe distance between persons is maintained.

The housing 2 may be compatible with one or more printing techniques, such as inkjet printing, screen printing, digital printing, or combination of digital and screen printing, which allows the housing to be customised to display information about the wearer thereof and the predetermined distance. The housing 2 could be customised by including one or more graphics, including branding (late customisation of the indicator device 1).

The housing 2 comprises two major planar surfaces 2*b*, each major planar being compatible with one or more printing techniques.

The housing 2 may include an antimicrobial agent located on at least a portion of one or more surfaces of the housing 2.

In an embodiment, the housing 2 is made from acrylonitrile butadiene styrene. In an embodiment, the housing 2 is manufactured using an injection moulding process. Other manufacturing techniques could be used.

The power supply 4, the indicator elements 8 and the proximity sensor 6 may be located on the same printed circuit board (PCB) 16, which is accommodated by the housing 2 therein.

In an embodiment, the housing 2 includes a light transmissive element 2*c*, which may be a substantially optically transparent member located on one or two planar surfaces of the housing 2, and may be arranged to be backlit by the visual indicator element 8*b*.

In an embodiment, at least a portion of the light transmissive element 2*c* is located on a major surface 2*b* of the housing 2 and at least a portion of the light transmissive element 2*c* is located on an upper minor surface 2*d* of the housing 2. In this arrangement, the wearer or user of the indicator device 1 can observe at least one of the visual indicator elements 8 by looking down onto the indicator device 1.

As shown in FIG. 1, the other indicator device 100 may comprise corresponding features of the indicator device 1, including the major planar surface 102*b* and upper minor surface 102*d* of the housing 102, the hole/aperture 102*a* (example attachment member receiving portion), the switch 112, and the light transmissive element 102*c*.

Figure 4:
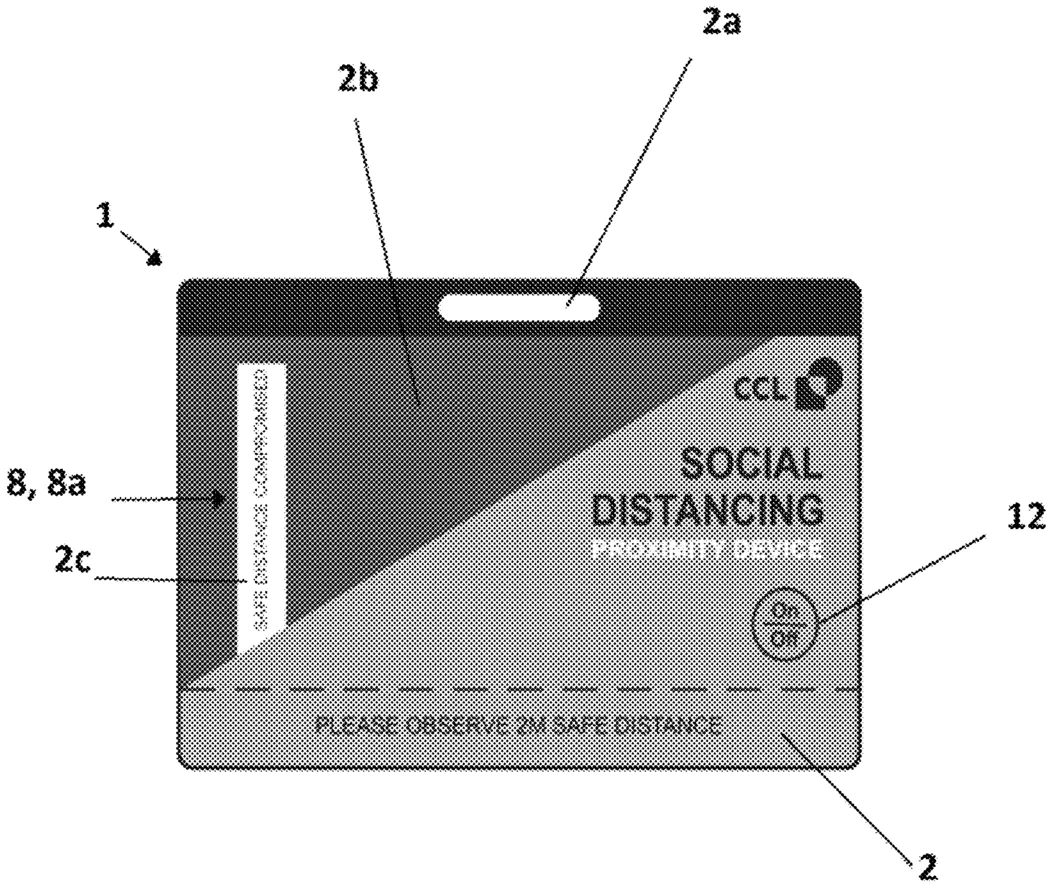
FIG. 4 shows another embodiment of the indicator device of FIG. 1*a;*

FIG. 4 shows an alternative embodiment of the indicator device 1. As shown in FIG. 4, the light transmissive element 4*c* may only be present on one surface of the housing 2, and indicia used for the device may be different (e.g. the on/off wording used to indicate the presence of the switch 12).

Figure 5:
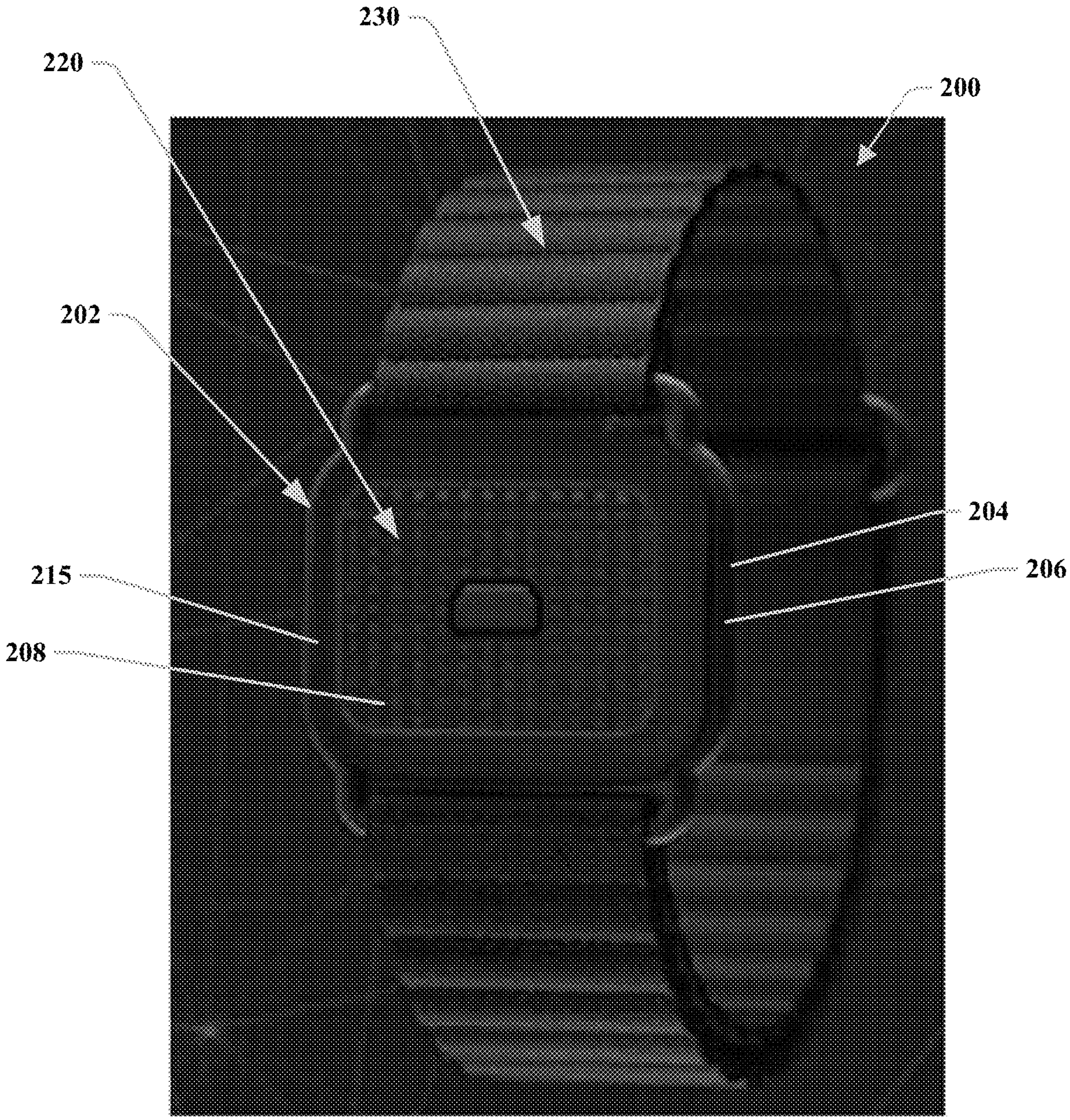
FIG. 5 shows another embodiment of the indicator device of FIG. 1*al*
Figure 6:
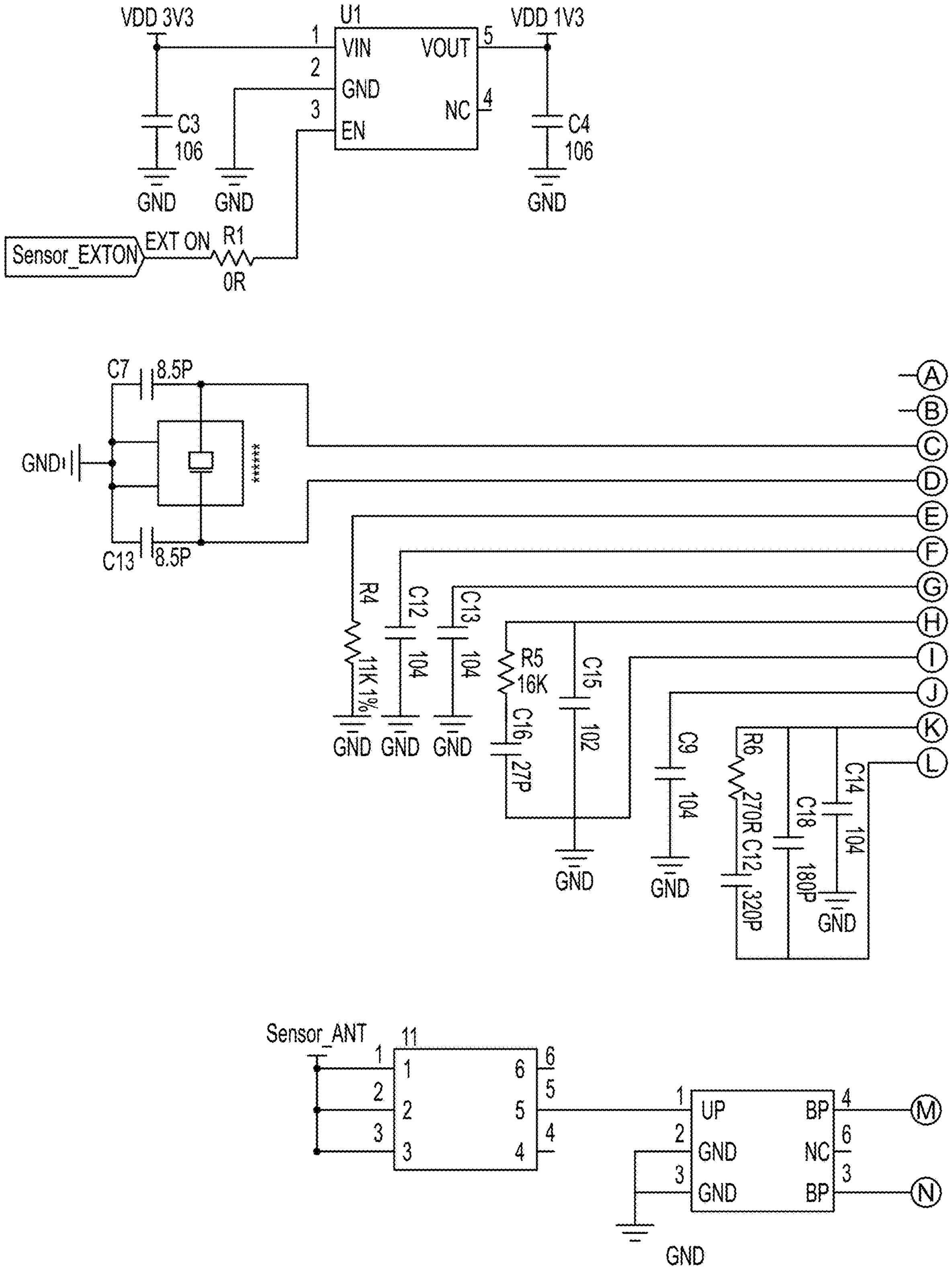
FIG. 6 shows a first schematic of a printed circuit board of the invention.
Figure 6:
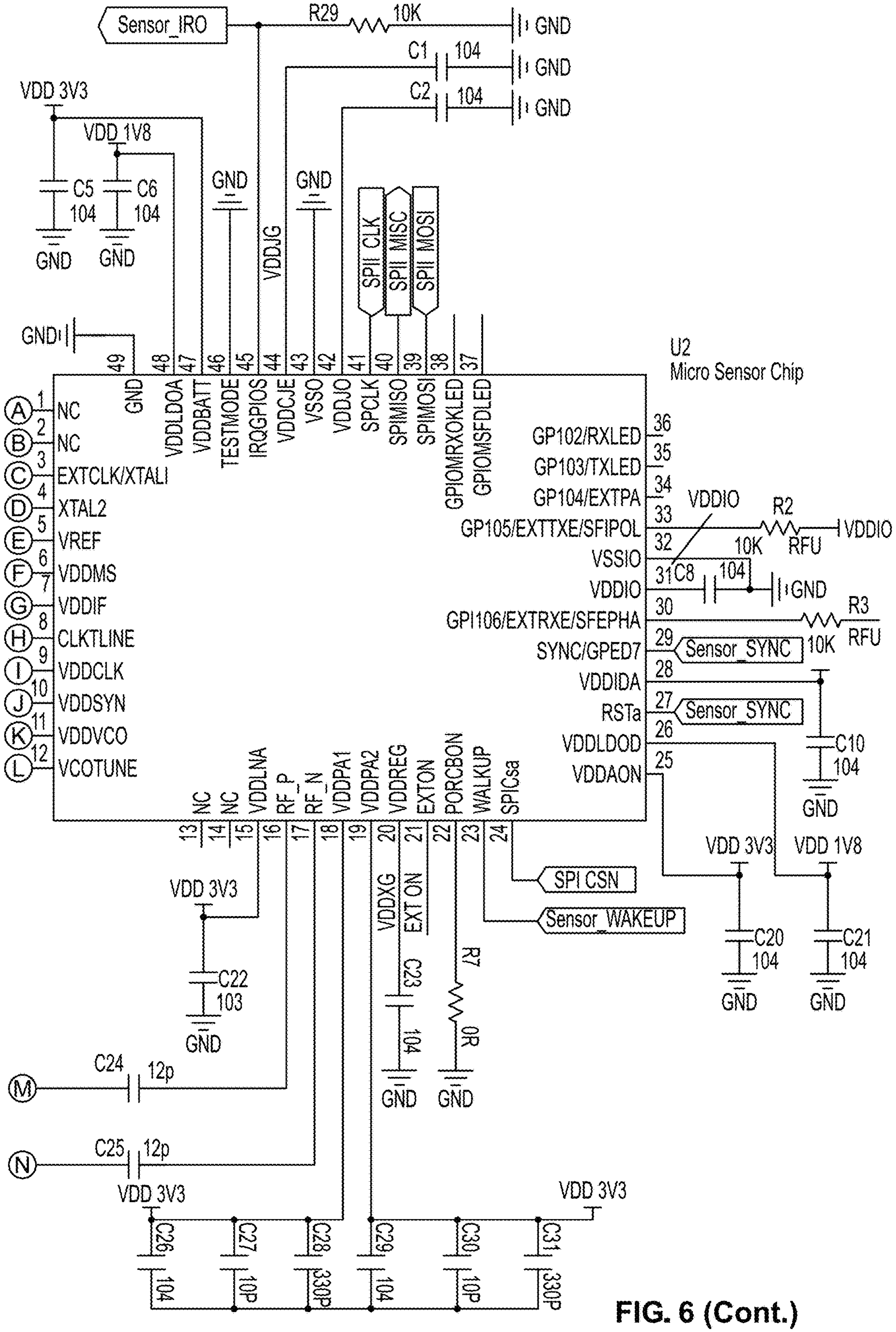
Figure 7:
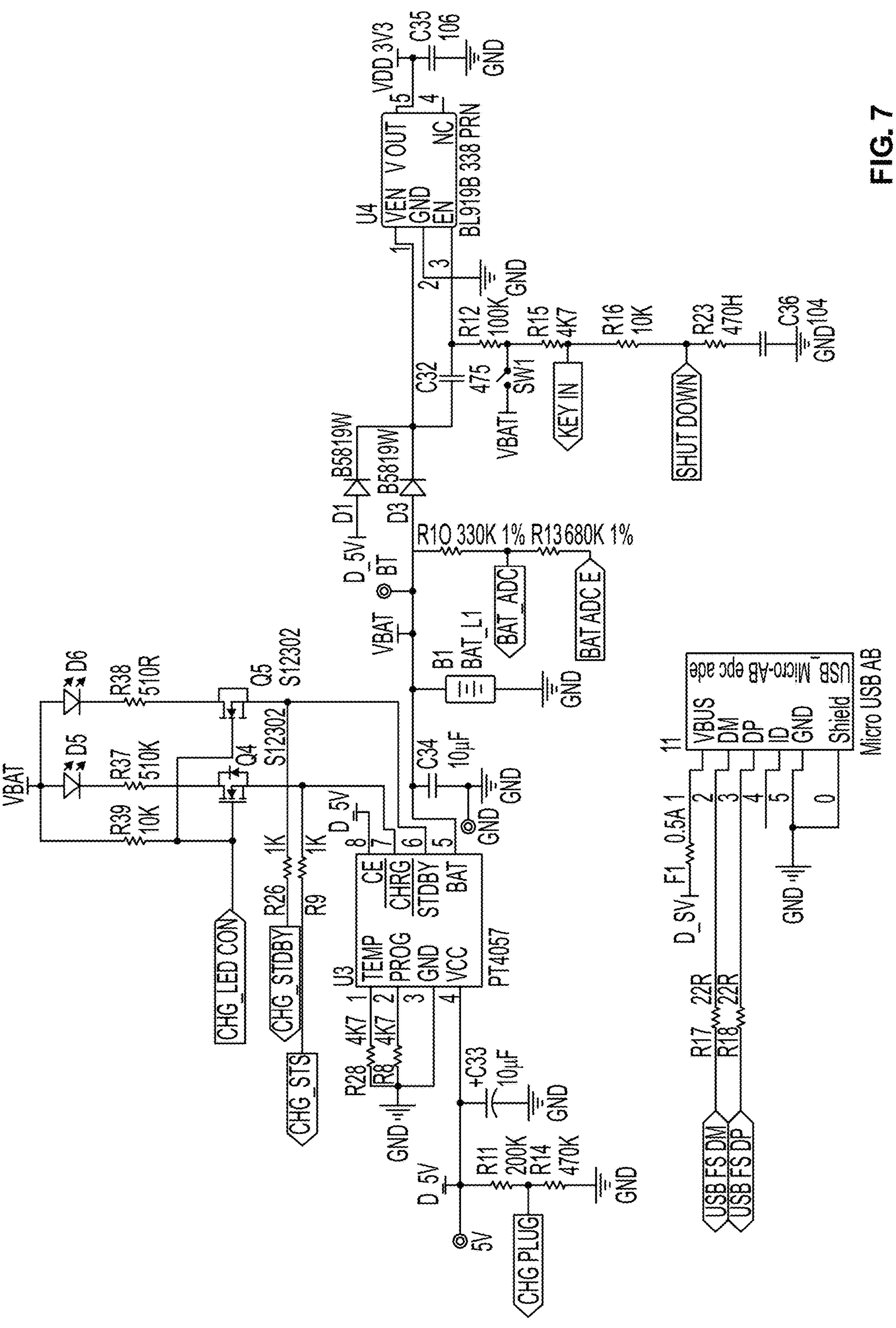
FIG. 7 shows a second schematic of a printed circuit board of the invention.
Figure 8:
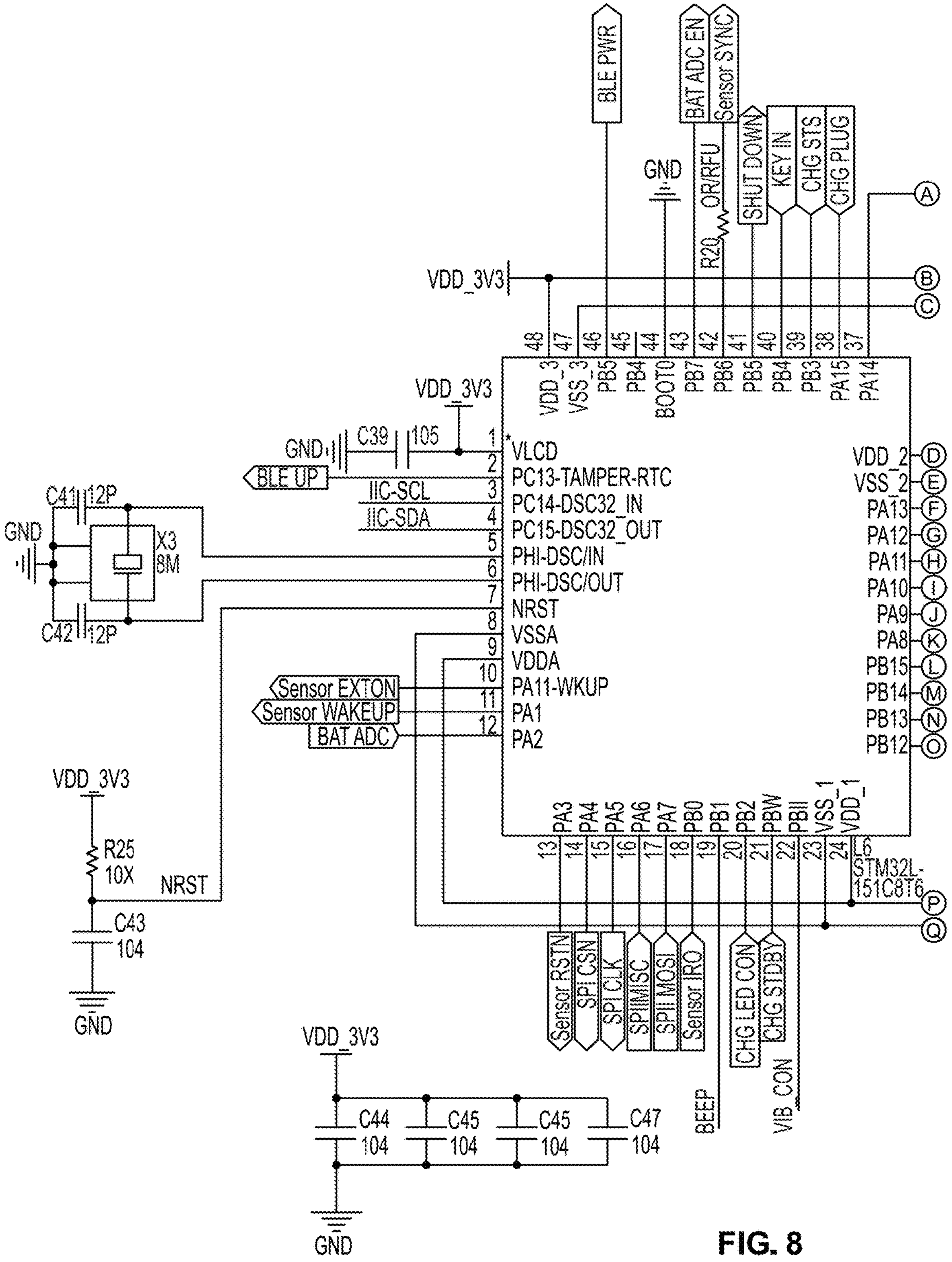
FIG. 8 shows a third schematic of a printed circuit board of the invention.
Figure 9:
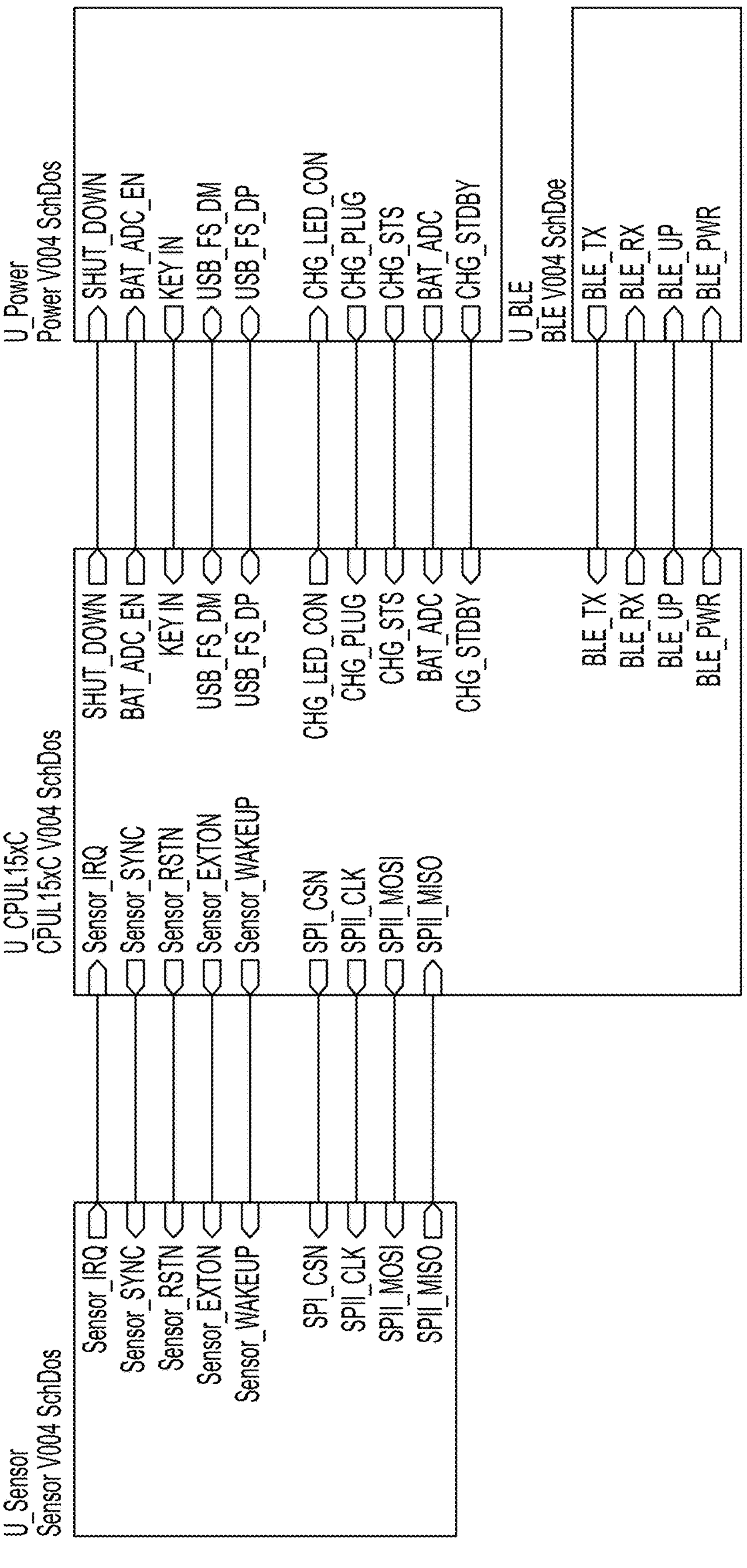
FIG. 9 shows a fourth schematic of a printed circuit board of the invention.

FIG. 5 shows an alternative embodiment which incorporated the indicator device 200 of the invention. In FIG. 5, the housing 202 is part of a wearable wristband type device 200 that may have a configuration that is similar to a wearable watch device having a wristband 230. The housing 202 may be configurable to include an authentication element (not shown), such that the indicator device can be used with an authentication element reader to regulate access to a secure or restricted area. The authentication element may be a barcode, a near field communication device, a photograph, indicia, a graphic, an image, text, a code, numbers, or any combination thereof, or the like.

The housing 202 of the device 200 shown in FIG. 5 may include a display 220 or be arranged to display the value of the predetermined distance of the exclusion zone. In this arrangement, the housing 202 and the display 220 display the value of the predetermined distance that will cause the proximity sensor 206 to operate the indicator element(s). The housing 202 may be arranged to continuously display the predetermined distance. The housing 202 may include a label, graphic, image, text, numbers, or the like, (not shown) for displaying the predetermined distance of the exclusion zone. The housing 202 may be arranged such that the predetermined distance is always visible to the user of the other device, 10, 100 (or another of the device 200, which may be referred to as 300) when the other device 10, 100, 300 is within the exclusion zone and when the indicator device 200 is worn, carried, held, or otherwise placed in a visible location by the user of the indicator device 200.

The indicator element 208, or elements, in a device 200 as depicted in FIG. 5 may include an audio, visual, haptic, and/or vibrotactile indicator element or combinations thereof. The audio indicator element(s) may include one or more speakers, and/or buzzers, or the like. The visual indicator element(s) may include one or more light emitting diode(s) (LED), or the like. The visual indicator element(s) may include a red, yellow or green LED display or a combination of these. At least one indicator element may include a vibrotactile device, haptic device, and/or a vibrator device. Additionally, any indicator elements as described in regard to any other embodiment herein may be used in this embodiment of a wearable device 202 and vice versa.

The visual indicator element(s) may include a label, text, graphic, photograph, numbers, or the like, for displaying the meaning of the visual indicator element(s) to the user of the other device 10, 100, 300.

The power supply 204 of a device 200 as shown in FIG. 5 may be located within the housing 202. The power supply 204 may be a replaceable power supply such as a button-type battery or a rechargeable power supply. The proximity sensor 206 may be located within the housing 202. At least one of the indicator element(s) 208 may be located at an outer surface 215 of the housing 202. At least one of the visual, auditory, or haptic indicator elements 208 may be located within the housing 202 and arranged to be visible, heard, or felt through the housing 202.

An indicator element 208 may be located within the housing 202. One or more indicator element(s) may be located within the housing 202 and one or more of the indicator element(s) 208 may be located outside of the housing 202. All of the components of the indicator device 200, 300 may be located within the housing 202, 302 thereof.

In an embodiment, one or more indicator devices 10, 100, 200, 300 may transmit location data to a server. For example, the location data may be superimposed on a map of a facility or workplace and show indicators for the location of each worker or user. The map with locations may be updated in real time or after a set period of time.

In an embodiment, the indicator device that is a wearable 10, 100 may be incorporated into a watch device (for example as described in regard to FIG. 5 and devices 200, 300) (or the watch device may be incorporated into the indicator device) that a user typically wears. In addition, the indicator device may comprise a wristband 230. In these embodiments, the wristband may be a disposable version, meaning that after its use it may be discarded. Alternatively, the wristband may be a non-disposable version, i.e., it isn't intended to be discarded and may be configured for multiple uses. In all of these embodiments, the indicator device incorporated into the wristband may be utilized in conjunction with wristbands commonly used to permit entrance to an event or location, such as a concert or theme park. These may be particularly useful for families. The wristband with the indicator may incorporate an RFID component that when read allows entrance to a blocked of area. Of course, the proximity sensor within the indicator device may also be utilized for the same purpose.

In addition to allowing access to an area, the indicator device may be utilized to ensure that a group of people, such as a family or school class are always within a predefined distance with one another. This would prevent one of the children/people from wandering off and potentially getting lost. An example, would be that each member of the group has a wristband with the indicator device. The wristband may be put on outside of the facility to which the group is accessing. The wristband may allow entrance to the facility. In addition, if any one of the group is more than a predetermined distance from anyone else within the group, the leader or parents may receive an alert on a device, such as a smartphone, or on their wristband with indicator device as described above. The person from the group that has exceeded the predetermined distance may also receive an alert. The indicator device may also include a proximity sensor that may be manually activated. In this case, if one of the wearers has wondered beyond the predetermined distance, is warned, he or she may activate the proximity sensor. The proximity sensor may provide a notification to the wearer as she gets closer or further to one of the others in the group or just the leader/parent. This could prevent children or others from getting lost in large venues such as theme parks and concerts. Of course, while a wristband is described herein, the indicator device could take on any of a number of different forms such as any kind of wearable device (e.g., ring, necklace, anklet, armband, headband, hat, clip for a shoe, etc. In addition, the indicator device could be a tag attached to a lanyard or any other similar device or mechanism.

FIGS. 6-9 show PCB (Printed Circuit Board) configurations of the indicator device of the invention. In FIGS. 6-9, the PCB configurations shown include one or more of the power supply, the indicator element(s), a memory device and the proximity sensor. The power supply, indicator elements, memory device and proximity sensor may be located on one or more PCBs. All of the electronic components of the indicator device may be located on the one or more PCBs.

Modifications may be made to the present invention without departing from the scope of the invention.

For example, whilst the indicator device 1 illustrated and described here provides an alert to the user thereof, in other embodiments, the indicator device could be configured to initiate an alert. That is, the indicator device 1 itself may not alert the user. In this arrangement, the indicator device 1 could be attached to an object, and the other device 100 could be attached to a user or another object, and the indictor device 1 could be operable to initiate an alert that the user or object has moved within a predetermined distance of the indicator device 1.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

The invention claimed is:

1. An indicator device for detecting the presence of another device and alerting a user of the indicator device, the indicator device comprising:

a housing comprising a substantially planar body;

an electrical power source;

a proximity sensor configured to detect the presence of the other device within a spherical range of the indicator device; and one or more indicator elements operable to alert the user of the indicator device;

wherein the proximity sensor is configured to operate the, or each, indicator element if the distance between the indicator device and the other device is below a predetermined value, wherein the predetermined value is a radius of the spherical range.

2. The indicator device of claim 1, wherein the other device is an indicator device for detecting the presence of the indicator device of claim 1, or another device, and alerting a user of the other indicator device, the other indicator device comprising:

a housing;

an electrical power source;

a proximity sensor configured to detect the presence of the indicator device, or another device; and one or more indicator elements operable to alert a user of the other indicator device;

wherein the proximity sensor is configured to operate the, or each, indicator element if the distance between the indicator device and the other device is below a predetermined value.

3. The indicator device of claim 1, wherein the proximity sensor of the indicator device is configured to operate the indicator element(s) substantially instantaneously in response to the indicator device and the other device being brought within the predetermined distance of each other, and/or wherein the proximity sensor is configured to deactivate the indicator element(s) substantially instantaneously in response to the indicator device and the other device no longer being within the predetermined distance of each other.

4. The indicator device of claim 1, wherein the predetermined distance defines an exclusion zone, and wherein the indicator device is operable to detect the presence of a plurality of other indicator devices within the predetermined distance, the indicator device being configured to trigger the, or each, indicator element when at least one of the plurality of other indicator devices is within the exclusion zone.

5. The indicator device of claim 1, wherein the proximity sensor of the indicator device is configured to detect the presence of identically programmed proximity sensors, or identically configured proximity sensors, of the other devices and to discard or ignore the presence of other devices within the exclusion zone.

6. The indicator device of claim 1, wherein the proximity sensor of the indicator device includes a control module operable to send one or more signals to the, or each, indicator element in response to signals received from the other device, or other devices, wherein the control module includes a single integrated circuit (IC).

7. The indicator device of claim 1, wherein the housing of the indicator device is a tag, a card, a security device, a security tag, a badge, a marker, an identification device, an identification card, an identification tag, a status identification device and/or a wearable device selected from a wristband, bracelet, adhesive attachable device.

8. The indicator device of claim 1, wherein the indicator device is operable to receive data from the other device, or any other device, and wherein the indicator device is configured to discard all data received from the other device, or any other device, such that no received data is stored by the indicator device.

9. The indicator device of claim 1, wherein the indicator device is configured to discard all data associated with the use thereof, such that no user data is stored by the indicator device.

10. The indicator device of claim 1, wherein the indicator device lacks a data storage device, such as a memory element, and wherein the indicator device is configured such that a data storage device cannot be communicatively connected therewith.

11. The indicator device of claim 1, wherein the indicator device is operable to automatically detect the presence of the other device, and to automatically trigger the, or each, indicator element.

12. The indicator device of claim 1, wherein the proximity sensor is operable to detect the presence of the other device using one or more wireless communication protocols.

13. The indicator device of claim 12, wherein the wireless communication protocol is Bluetooth.

14. The indicator device of claim 1, wherein the proximity sensor includes a transceiver element, and wherein the proximity sensor is configured to only be responsive to proximity sensors comprising an identical transceiver element as the proximity sensor of the indicator device.

15. The indicator device of claim 14, wherein the indicator device comprises a single proximity sensor, a single control module, a single transceiver element, and a single power supply.

16. The indicator device of claim 1, wherein the proximity sensor is configured to operate within a frequency band, or frequency bands, of the RF spectrum, and wherein the frequency band or bands are located at a different region of the RF spectrum to the mobile phone, or cellular phone, network bands.

17. The indicator device of claim 1, wherein the indicator device is configured to be wearable.

18. The indicator device of claim 17, wherein the indicator device is configured to be worn, in use, around the user's neck or wrist or is configured to be attachable to a garment of the user.

19. The indicator device of claim 1, wherein the indicator device comprises one or more control elements operable to activate and deactivate the indicator device, or the indicator element(s) thereof, for a period of time, optionally for approximately 2 minutes, optionally for 2 minutes or less, optionally for approximately 1 minute, optionally for 1 minute or less, optionally for approximately 30 seconds, optionally for 30 seconds or less.

20. The indicator device of claim 1, wherein the body comprises one or more major planar surfaces, the surface(s) being configured to be compatible with one or more printing techniques.

21. The indicator device of claim 1, wherein the indicator element(s) include at least one of: a visual indicator element, an audio indicator element and a vibrotactile indicator element.

22. The indicator device of claim 21, wherein the indicator device includes a single visual indicator element and a single vibrotactile indicator element.

23. The indicator device of claim 1, wherein the indicator device is operable to receive data from the other device, or any other device, and wherein the indicator device further comprises a data storage device and is configured to retain some or all data received from the other device, or any other device.

24. The indicator device of claim 23, wherein the indicator device is configured to retain all data associated with the use thereof.

25. The indicator device of claim 23 wherein the indicator device is configured to allow for the indicator device to communicate with a separate device and to transmit stored data to the other separate device.

26. The indicator device of claim 25 wherein the separate device is a cell phone or computer.

27. The indicator device of claim 25 wherein the transmission of stored data is accomplished by Bluetooth, BLE or Wi-Fi.

28. The indicator device of claim 1 wherein the proximity sensor is operable to detect the presence of the other device using one or more wireless communication protocols.

29. The indicator device of claim 28 wherein the wireless communication protocol is UWB.

30. The indicator device of claim 1, wherein the indicator device lacks a data storage device, such as a memory element, and wherein the indicator device is configured such that a data storage device can be communicatively connected therewith.

31. The indicator device of claim 30 wherein the indicator device is configured to allow for the indicator device to communicate with a data storage device and to transmit data directly to the data storage device.

32. The indicator device of claim 30 wherein the data storage device is a cell phone or computer.

33. The indicator device of claim 30 wherein the transmission of data is accomplished by Bluetooth, UWB, BLE or Wi-Fi.

34. The indicator device of claim 30 wherein the proximity sensor is operable to detect the presence of the other device using one or more wireless communication protocols.

35. The indicator device of claim 34 wherein the wireless communication protocol is UWB.

36. A system comprising:

two or more indicator devices, wherein each indicator device is for detecting the presence of the other indicator device, or another device, and alerting a user of the indicator device, each indicator device comprising:

a housing comprising a substantially planar body;

an electrical power source;

a proximity sensor configured to detect the presence of the other indicator device, or another device within a spherical range of the indicator device; and one or more indicator elements operable to alert a user of the indicator device;

wherein the proximity sensor is configured to operate the, or each, indicator element if the distance between the indicator device and the other device is below a predetermined value, wherein the predetermined value is a radius of the spherical range.

37. A method of using a system comprising the steps of:

(i) providing: two or more indicator devices, wherein each indicator device is configured to detect the presence of the other indicator device, or another device, and wherein each indicator device is communicatively coupled with the other indicator device, or the other device, via an electromagnetic radiation transceiver, and is configured to alert a user of the indicator device, each indicator device comprising:

a housing;

an electrical power source;

a proximity sensor configured to detect the presence of the other indicator device, or another device; and one or more indicator elements operable to alert a user of the indicator device;

wherein the proximity sensor is configured to operate the, or each, indicator element if the distance between the indicator device and the other device is below a predetermined value;

(ii) activating each indicator device; and (iii) using each indicator device to determine whether the indicator device and the other indicator are below the predetermined value.

38. An indicator device comprising:

a housing including a wearable device configured to be worn by a user, wherein the wearable device is selected from the group consisting of a wristband, bracelet, necklace, pin, a headband, or adhesive attachable housing, wherein the housing includes:

a proximity sensor with a transceiver element configured to wirelessly detect the presence of another device in a spherical range, and an indicator element operable to alert the user of the indicator device, wherein the proximity sensor is configured to operate the indicator element if the distance between the indicator device and another device exceeds a predetermined value, wherein the predetermined value is a radius of the spherical range.

* * * * *